US010473098B2

United States Patent
Li et al.

(10) Patent No.: US 10,473,098 B2
(45) Date of Patent: Nov. 12, 2019

(54) RECIPROCATING PLUNGER PUMP AND ITS ENGINE BODY, THE SLIDER CRANK MECHANISM AND THE SLIDE BLOCK, THE BEARING SEAT, THE CRANKCASE UPPER COVER AND THE PLUNGER SEAT

(71) Applicant: BEIJING SINOCEP ENGINE TECHNOLOGY CO., LTD, Beijing (CN)

(72) Inventors: Ming Li, Beijing (CN); Zhengzhong Li, Beijing (CN)

(73) Assignee: BEIJING SINOCEP ENGINE TECHNOLOGY CO., LTD., Beijing (CN)

( * ) Notice: Subject to any disclaimer, the term of this patent is extended or adjusted under 35 U.S.C. 154(b) by 384 days.

(21) Appl. No.: 15/103,697

(22) PCT Filed: Dec. 3, 2014

(86) PCT No.: PCT/CN2014/092916
§ 371 (c)(1),
(2) Date: Jun. 10, 2016

(87) PCT Pub. No.: WO2015/085883
PCT Pub. Date: Jun. 18, 2015

(65) Prior Publication Data
US 2016/0305421 A1  Oct. 20, 2016

(30) Foreign Application Priority Data
Dec. 12, 2013 (CN) .......................... 2013 1 0676866

(51) Int. Cl.
*F04B 53/00* (2006.01)
*F04B 1/04* (2006.01)
(Continued)

(52) U.S. Cl.
CPC .......... *F04B 53/006* (2013.01); *F04B 1/0413* (2013.01); *F04B 9/045* (2013.01);
(Continued)

(58) Field of Classification Search
CPC ...... F04B 53/006; F04B 53/16; F04B 53/007; F04B 53/14; F04B 53/144; F04B 19/22;
(Continued)

(56) References Cited

U.S. PATENT DOCUMENTS 4,173,151 A * 11/1979 Grundy ..................... F01B 9/02
74/49
4,264,286 A   4/1981 Reinkemeyer
(Continued)

FOREIGN PATENT DOCUMENTS

CN     85100358 B    1/1988
CN     85100359 B    12/1988
(Continued)

OTHER PUBLICATIONS

Japanese Patent Application No. JP2016-558251, "Office Action", dated Sep. 5, 2018, 8 pages.
(Continued)

*Primary Examiner* — Nathan C Zollinger
(74) *Attorney, Agent, or Firm* — Kilpatrick Townsend & Stockton LLP

(57) ABSTRACT

The present disclosure provides a reciprocating plunger pump, which includes a plunger pump engine body, a plunger pump head and a slider crank mechanism which is located in the plunger pump engine body. Also disclosed are a reciprocating plunger pump engine body, a slider crank mechanism and a slide block, a bearing seat, a crankcase upper cover and a plunger seat.

15 Claims, 10 Drawing Sheets

(51) Int. Cl.
  *F04B 9/04* (2006.01)
  *F04B 53/14* (2006.01)
  *F16C 3/10* (2006.01)
  *F04B 19/22* (2006.01)
  *F04B 53/16* (2006.01)
  *F04B 17/05* (2006.01)
  *F04B 1/16* (2006.01)

(52) U.S. Cl.
  CPC ............ *F04B 19/22* (2013.01); *F04B 53/007* (2013.01); *F04B 53/14* (2013.01); *F04B 53/144* (2013.01); *F04B 53/16* (2013.01); *F16C 3/10* (2013.01); *F04B 1/16* (2013.01); *F04B 17/05* (2013.01)

(58) Field of Classification Search
  CPC .. F04B 17/03; F04B 1/16; F04B 9/045; F04B 1/0413; F04B 17/05; F16C 3/10
  See application file for complete search history.

(56) References Cited

U.S. PATENT DOCUMENTS

| | | | | |
|---|---|---|---|---|
| 4,270,395 A * | 6/1981 | Grundy | ............... | F01B 9/02 74/49 |
| 4,648,806 A * | 3/1987 | Alexander | ............. | F04B 49/12 417/238 |
| 5,375,566 A * | 12/1994 | Brackett | ................ | F01B 9/023 123/197.1 |
| 5,934,229 A * | 8/1999 | Li | ........................ | F01B 9/023 123/192.2 |
| 6,082,314 A * | 7/2000 | Li | ........................ | F02B 75/18 123/55.4 |
| 8,109,737 B1 * | 2/2012 | Gamble | .................. | F01B 1/08 417/221 |
| 8,371,210 B2 * | 2/2013 | Raffaele | ................ | F01B 9/023 92/129 |
| 8,931,442 B2 * | 1/2015 | Li | ........................... | F02F 1/00 123/54.4 |
| 9,593,579 B2 * | 3/2017 | Li | ........................... | F01B 9/026 |
| 2007/0079698 A1 * | 4/2007 | Raffaele | ................ | F01B 9/023 92/72 |
| 2011/0171044 A1 * | 7/2011 | Flanigan | ................ | F04B 53/16 417/254 |
| 2012/0160041 A1 * | 6/2012 | Li | .......................... | F04B 35/01 74/49 |
| 2013/0160580 A1 * | 6/2013 | Li | .......................... | F02B 75/32 74/44 |
| 2013/0209297 A1 * | 8/2013 | Goertzen | ............... | F04B 25/00 417/443 |

FOREIGN PATENT DOCUMENTS

| | | |
|---|---|---|
| CN | 1067741 C | 6/2001 |
| CN | 1067742 C | 6/2001 |
| CN | 101691887 A | 4/2010 |
| CN | 101761417 A | 6/2010 |
| CN | 101644324 A | 10/2010 |
| CN | 101858275 A | 10/2010 |
| CN | 203868143 U | 10/2014 |
| JP | 55035344 | 3/1980 |
| JP | 03056884 | 6/1991 |
| JP | 2004003505 | 1/2004 |
| WO | 2008010490 | 1/2008 |

OTHER PUBLICATIONS

International Patent Application No. PCT/CN2014/092916, "International Search Report" dated Feb. 27, 2015.
European Application No. 14870594.0, Partial Supplementary European Search Report dated Nov. 10, 2017, 16 pages.

* cited by examiner

RECIPROCATING PLUNGER PUMP AND ITS ENGINE BODY, THE SLIDER CRANK MECHANISM AND THE SLIDE BLOCK, THE BEARING SEAT, THE CRANKCASE UPPER COVER AND THE PLUNGER SEAT

CROSS REFERENCE TO RELATED APPLICATION

This application is a national stage application under 35 U.S.C. § 371 of PCT/CN2014/092916 filed Dec. 3, 2014, which claims priority to Chinese Application No.: 201310676866.X filed Dec. 12, 2013, entitled "A Reciprocating Plunger Pump", the disclosures of each which are hereby incorporated by reference herein in their entireties.

TECHNICAL FIELD

The present invention relates to the technical field of the interconversion of reciprocating motion and rotation motion, particularly relates to a reciprocating plunger pump. The present invention simultaneously relates to a reciprocating plunger pump engine body, a slider crank mechanism and a slide block, a bearing seat, a crankcase upper cover and a plunger seat.

BACKGROUND ART

The reciprocating plunger pump as a volumetric pump, it reaches the purpose of delivering liquid by the periodical change of the volume in the working chamber. The mechanical energy is converted directly into pressure energy for delivering the liquid when it works.

As mentioned above, a reciprocating plunger pump can reach the purpose of outputting the liquid under a certain pressure by pulsed press to the liquid by means of periodical reciprocating motion of the plunger (also known as a piston); the reciprocating motion is obtained by motion transformation mechanism from transformation of rotation motion. In a traditional reciprocating plunger pump, the motion transformation mechanism adopts the crank connecting rod mechanism, which makes the reciprocating plunger pump huge and cumbersome due to the existence of the connecting rod which requires reciprocating swing while it works in the crank connecting rod mechanism.

To overcome the defects of the traditional crank connecting rod mechanism mentioned above, Chinese patent application CN85100358B published a Slider Crank Reciprocating Piston Internal Combustion Engine; Chinese patent application CN85100359B published a Slider Crank Reciprocating Piston Compressor; Chinese patent application CN1067741C published a Double Slider Crank Reciprocating Piston Internal Combustion Engine; Chinese patent application CN1067742C published a Multi-Slider Crank Reciprocating Piston Internal Combustion Engine. In the transformation mechanism of reciprocating motion and rotation motion in the internal combustion engines and compressors mentioned in the above Chinese patent applications, the crank connected rod mechanism is replaced by the slider crank mechanism, which comprises a slide block, a piston and a crankshaft, wherein the slide block is provided with an eccentric circular hole, the piston seat is provided with an accommodation bore for the slide block. When an operator assembles, the slide block can be located into said accommodation bore of the slide block which the slide block can be rotated in said accommodation bore of the slide block; the crankpin of the crankshaft can be located into said eccentric circular bore which the crankpin can be rotated in it.

Taking the work of internal combustion engines for examples, the motion transformation progress of the slider crank mechanism is shown as follows: the piston is pushed to move by the expansion due to burning the combustion gas inside the chamber, which will cause the reciprocating motion of the slide block provided in it to move by the movement of the piston, meanwhile the slide block is also in rotation motion in said piston, the compound of said reciprocating motion and rotation motion leads the central axis of the eccentric circular bore which is located on the slide block to be in rotation motion by the central axis of the crankshaft; said central axis of the eccentric circular bore is overlapped with the axis of the crankshaft's crankpin, which can reach the purpose of the transformation from the reciprocating motion of the piston to the rotation motion of the crankshaft. The compressor can adopt the same mechanism, the crankshaft is drove in rotation by the electrical machine, which achieves the reciprocating motion of the piston by the coordination between the slide block, the crankshaft and the piston and then to work on the compressed medium.

The slider crank mechanism which is published in the above-mentioned Chinese patent applications can be applied into the traditional reciprocating plunger pump to replace the crank-connected rod mechanism. However, because the reciprocating plunger pump has the characteristics which are different from said internal combustion or the compressor, it has to be improved according to the characteristics of the reciprocating plunger pump itself during the application of the slider crank mechanism into the reciprocating plunger pump.

SUMMARY OF THE INVENTION

The present invention provides a reciprocating plunger pump, which solves problems of the present reciprocating plunger pump mentioned above.

The present invention simultaneously provides a reciprocating plunger pump body, a slider crank mechanism and a slide block, a bearing seat, a crankcase upper cover and a plunger seat;

The present invention provides a reciprocating plunger pump, which comprises a plunger pump engine body, a plunger pump head and a slider crank mechanism which is located in said plunger pump engine body;

said plunger pump engine body comprises an engine seat, a crankcase upper cover provided on said engine seat, and a bearing seat provided in the internal spaces formed between said engine seat of the plunger pump and the crankcase upper cover;

The plunger pump engine seat comprises a bottom wall and a bottom sidewall which is integrally formed with said bottom wall and extends from the edge of the bottom wall away to the surface of the bottom wall; said crankcase upper cover comprises an upper wall and an upper sidewall which extends from the upper wall outward from the surface of the upper wall;

said engine seat of the plunger pump and the crankcase upper cover are buckled into one piece, the relevant position of the free end in both the upper sidewall and bottom sidewall are connected into one piece by the connector; the upper sidewall and bottom sidewall surrounding the internal spaces are provided with a crankshaft penetrating bore; the crankshaft penetrating bore is formed by the half bore which is opened on the relevant upper sidewall and the bottom sidewall.

The internal spaces formed between the engine seat of the plunger pump and the crankcase upper cover is the crankcase space which is provided with a bearing seat including its body, the bearing seat is provided with at least one lower half bearing bore; the bearing seat and the crankcase upper cover are fixedly fitted into one piece, the lower half bearing bore and the upper half bearing bore which is located on the relevant position of the crankcase upper cover form a complete bearing bore which is the middle bearing bore; the middle bearing bore is located in the middle of the two crankshaft penetrating bores.

The location corresponding to the penetrating location of the crankcase upper cover is provided with a through bore which is the plunger bore;

The slider crank mechanism is including the reciprocating parts, unsplit crankshaft and slide block; the reciprocating parts are containing reciprocating parts body which is provided with a circular through bore which is the accommodation bore of slide block; the reciprocating parts body is provided with a guide section which is along the reciprocating motion direction with an oriented surface;

The slide block comprises the slide block body and the annular outer ring which is fitted over on the peripheral region of the slide block body; the slide block body is the split structure and provided with an eccentric circular bore, the subdivision surface passes through the central of the eccentric circular bore which divides it into two identical half bores, which are the first section and the second section;

The first section of the slide block body is provided with an assembly bore which is opened on the subdivision surface is the first section assembly bore; the relevant position between the second section and the first section of the assembly bore is provided with a through bore which is penetrating from the second section of the subdivision surface to the peripheral surface;

The unsplit crankshaft is containing at least one crankpin;

The crankpin of the unsplit crankshaft is fitted over by at least one slide block by penetrating the eccentric circular bore, each of the slide blocks is fitted into the accommodation bore of the slide block in the reciprocating parts;

The crankshaft is located in the crankshaft space, the corresponding crankshaft main journal and the crank arm are supported in the bearing seat bore; one end of the installation and working part of the reciprocating parts, which is cooperated with the plunger pump head provided on the outer side of the plunger bore, penetrates into relevant plunger bore.

Alternatively, an upper sidewall relative to the crankcase upper cover is respectively provided with the half bores of crankshaft penetrating bores; the other relative upper sidewall is an inclined sidewall, which the distance between the two inclined sidewalls increased as they move away from the upper wall; the two inclined sidewalls are provided with a through bore for penetrating plunger, which is the plunger bore; the upper section of the crankcase upper sidewall forms the assembly surface of the engine seat assembling;

The internal spaces formed between the bottom wall and upper sidewall are simultaneously provided with two or more half bearing bores which are upper half bearing bores, the axis of the upper half bearing bore is overlapped with the axis of the half bore of the crankshaft penetrating bore; it is constituted a group of plunger bores by the plunger bores on the two inclined sidewalls which are between any of the two adjacent half bearing bores or between the half bearing bores and the half bores of the adjacent crankshaft penetrating bores; The bearing seat is including the bearing seat body; the two or more half bearing bores are arranged on the coaxial of the bearing seat body, which are the lower half bearing bores; a group of the oriented track with two orthogonal axes is respectively arranged on the bearing seat body which is located between the two adjacent lower half bearing bores and the bearing seat body which is located on the edge of the any one of the outer half bearing bores; the two oriented tracks of each group of the oriented tracks are respectively located on both side of the axis of the lower half bearing bore which is perpendicular to the axis of the two oriented tracks and in the separate setting distance along with direction of the axis of the half bearing bore; the plunger bore is arranged relevant to each of the oriented tracks.

Alternatively, the crankshaft is a three-throw four-supported crankshaft, the reciprocating parts are the six plungers containing the plunger seat and the plunger of the plunger head, there are six of the slide blocks which are made into the double slide blocks group with phase difference of 180 degree in pairs, the reciprocating motion direction of the two plungers fitted over by the double slide block groups forms an angle of 90 degree; correspondingly, there are three plunger bores which are located on the two inclined sidewalls on the crankcase upper cover respectively.

Alternatively, in the double slide blocks groups, the two slide blocks of the slide block groups are alternatively named the first slide block and the second slide block; the first section of the first slide block and the second section of the second slide block are fitted into one piece, which the peripheral regions of the two slide blocks are provided with the annular outer rings.

Alternatively, the plunger seat body along the surface of the center of the accommodation bore of the slide block is divided into two parts, which are the upper half part and the lower half part, the accommodation bore of the slide block is divided into two half accommodation bores of the slide block which the two oriented parts are located on the upper part and the lower part respectively, the upper part and the lower part are fixed into one piece by the connector.

Alternatively, the subdivision surface is perpendicular to the reciprocating motion direction of the plunger seat, a through bore which is penetrating through the upper part and the lower part is respectively located in the two opposite sidewalls which are located in both the plunger seat body and the accommodation bore of the slide block; the course of the through bore is in accordance with the direction of the reciprocating motion of the plunger seat;

After the upper part and the lower part are fitted into a complete plunger seat body, the relevant through bores of the upper part and the lower part are in alignment, and the two half accommodation bores of the slide block are in alignment, which forms a complete accommodation bores of the slide block, the upper part and the lower part are fitted into one piece by the connector penetrating through the through bore.

Alternatively, the texture of the annular outer ring is different from the texture of the slide block body, the abrasion resistance of the outer ring is better than the slide block body's.

Alternatively, the plunger pump is the plunger water pump.

The present application provides a slider crank mechanism, comprising the reciprocating parts, the unsplit crankshaft and the slide block;

The reciprocating parts contains the reciprocating parts body which is provided with a circular through bore which is the accommodation bore of slide block; the reciprocating parts body is provided with a guide section which is along the reciprocating motion direction with an oriented surface;

The slide block comprises the slide block body and the annular outer ring which is fitted over by the peripheral region of the slide block body; the slide block body which is provided with an eccentric circular bore is of split structure, the subdivision surface passes through the central of the eccentric circular bore which divides it into two identical half bores, which are the first section and the second section;

The first section of the slide block body is provided with an assembly bore which is opened on the subdivision surface is the first section assembly bore; the relevant position between the second section and the first section of the assembly bore is provided with a through bore which is penetrating from the second section of the subdivision surface to the peripheral surface;

The unsplit crankshaft contains at least one crankpin; The crankpin of the unsplit crankshaft is fitted over by at least one slide block by penetrating the eccentric circular bore, each of the slide blocks is fitted into the accommodation bore of the reciprocating parts.

Alternatively, the reciprocating part is the piston or the dynamic balance slide block or the plunger seat;

Alternatively, the two or multiple slide blocks form the slide block group which the adjacent slide blocks are arranged at the angle of 180 degree, in the adjacent slide blocks, wherein the first section of one of the slide blocks and the second section of another slide block are fixed into one piece.

Alternatively, the slide block group consists of two slide blocks, the axial direction of the two reciprocating parts fitted over by two slide block is at the angle of 90 degree.

The present application provides a slide block for slider crank mechanism, comprising the slide block body and the annular outer ring which is fitted over by the peripheral region of the slide block body;

The slide block body is a cylinder with two opposite end surfaces and the peripheral surfaces, the slide block body is provided with a circular through bore penetrating through the two end surfaces, and the central axis of which is parallel to the central axis of the slide block body, which is the eccentric circular bore;

Wherein, the slide block body is the split structure; the subdivision surface passes through the central of the eccentric circular bore which divides it into two identical half bores;

The two parts which are divided from the slide block body are the first section and second section respectively; the first section is provided with an assembly bore which is opened on the subdivision surface is the first section assembly bore; the relevant position between the second section and the first section of the assembly bore is provided with a through bore which is penetrating from the second section of the subdivision surface to the peripheral surface;

When an operator assembles, the assembly bore of the first section aligns with the through bore of the second section, the connector penetrates the through bore and screws into the relevant assembly bore of the first section, which assembles the two parts dividing from the slide block body into one piece.

The present application provides a slide block group, comprising at least two slide blocks, each of the slide blocks adopt the slide blocks as claimed in claim 13;

The adjacent slide blocks are at the angle of 180 degree, wherein the adjacent slide blocks, the first section of one slide block and the second section of another slide block are fixed into one piece.

Alternatively, the slide block group is made of two slide blocks, which are the first slide block and the second slide block respectively;

The first section of the first slide block and the second section of the second slide block are fitted into one piece, which the peripheral regions of the two slide blocks are provided with the annular outer rings.

The second section of the first slide block and the first section of the second slide block are the separated structures, or both of them are the integrative structures.

The present application provides a bearing seat applying to the engine body of the reciprocating motion part apparatus of the slider crank mechanism, including the bearing seat body; the two or more half bearing bores are arranged on the coaxial of the bearing seat body, an oriented track with a group of two orthogonal axes is respectively arranged on the bearing seat body located between the two adjacent half bearing bores as well as the bearing seat body on the edge of the any one of the outer half bearing bores;

The two oriented tracks in each group of the oriented tracks are respectively located on both side of the axis of the half bearing bore, the axes of the two oriented tracks are perpendicular to the axis of the half bearing bores, which is in the separate setting distance along the direction of the axis of the half bearing bore.

The present invention provides an engine body of the reciprocating plunger pump, which comprises an engine seat, a crankcase upper cover provided on the engine seat, and a bearing seat provided in the internal spaces formed between said engine seat of the plunger pump and the crankcase upper cover;

The engine seat comprises a bottom wall and a bottom sidewall which is integrally formed with the bottom wall and extending from the edge of the bottom wall away from the surface of the bottom wall; said crankcase upper cover comprises an upper wall and an upper sidewall which extends from the upper wall outward from the surface of the upper wall;

said engine seat and the crankcase upper cover are buckled into one piece, the relevant position of the free end in both the upper sidewall and bottom sidewall are connected into one piece by the connector; the upper sidewall and bottom sidewall surrounding the internal spaces are provided with a crankshaft penetrating bore; the crankshaft penetrating bore is formed by the half bore which is located on the relevant upper sidewall and the bottom sidewall.

The internal spaces formed between the engine seat and the crankcase upper cover are provided with a bearing seat including the body of it, the bearing seat is provided with at least one lower half bearing bore; the bearing seat and the crankcase upper cover is fixedly fitted into one piece, the lower half bearing bore and the upper half bearing bore which is located on the relevant position of the crankcase upper cover form a complete bearing bore which is the middle bearing bore; the middle bearing bore is located in the middle of the two crankshaft penetrating bores;

The location corresponding to the penetrating location on the crankcase upper cover is provided with a through bore which is the plunger bore;

The present application provides a crankcase upper cover for the engine body of the reciprocating plunger pump, including an upper wall and an upper sidewall which extends from the upper wall outward from the surface of the upper wall;

The crankcase upper cover relevant to the upper sidewall is respectively provided with the half bores of crankshaft penetrating bores; the other relevant upper sidewall is an inclined sidewall, which the distance between the two inclined sidewalls increased as they move away from the upper wall; the two inclined sidewalls are provided with a through bore for penetrating plunger, which is the plunger bore; the upper section of the crankcase upper sidewall forms the assembly surface of the engine seat assemble;

The internal spaces formed between the bottom wall and upper sidewall are provided with the upper half bearing bores which are the upper half bearing bores, the axis of the upper half bearing bore is overlapped with the axis of the half bore of the crankshaft penetrating bore;

The location corresponding to the penetrating location of the two inclined sidewalls is provided with a through bore which is the plunger bore.

The present application provides a plunger seat for the motion transformation mechanism of the slider crank block, wherein the plunger seat body and the two opposite ends extending outward from the plunger seat body form the extending parts, the two extending parts are the first guide section and the second guide section respectively;

The plunger seat body along its thickness direction is provided with a through bore, which is the accommodation bore of the slide block;

The axes of the first guide section and the second guide section along the reciprocating motion direction of the plunger seat are overlapped, at least two opposite sidewalls of the axes are provided with the oriented surfaces.

The present application, on one hand, the reciprocating plunger pump is the three separated structure, including the crankcase upper cover, the bearing seat of the crankshaft provided with a slip way for guiding the upper section of the plunger (also known as the oriented track) and the engine seat, the three parts are fitted into one piece by the connector, which not only simplifying the manufacture of the engine seat but also making the assemble and disassemble easier; at the same time, it also improves the stiffness and intensity of the engine body by the bearing seat specially arranged inside of the crankcase; the slide block body is a separated structure which is easy to be fitted on the unsplit crankshaft, and in the peripheral region of the slide block body is provided with an annular outer ring to prevent the abrasion of the slide block during working, which provides the continuous peripheral surfaces in the peripheral region of the slide block and refrains damages to the interface from the direct contact between the external contour of the through bore in the slide block body and the internal region of the slide block accommodation bore or the bearing located in the internal region in the reciprocating motion part; especially for the high-powered internal combustion engine, the compressor and the plunger pump, a needle roller bearing is always provided in the internal region of the slide block accommodation of the reciprocating part, but if the external contour of the through bore in the separated slide block body directly contact with the needle roller bearing, it will cause damages to the needle roller bearing, which will affect the service life and stability of the device. The slide block provided in the present application can avoid this kind of problem; in addition, the slide block is provided in the form of combination the slide block body with the annular outer ring, which will be possible for the slide block body and the annular outer ring to respectively choose different texture or operate individual fabrication process, for example, because the annular outer ring needs to friction contact with the reciprocating part, it can choose the texture with high abrasion resistance to manufacture the annular outer ring, and it can also conduct a special progress to the annular outer ring to make further improvement of the abrasion resistance.

The volume and weight of the plunger pump provided by the present application is less than one third of the traditional plunger pump of the same displacement, and it is easy manufacturing and has the more extensive usable range. In addition, the plunger pump mechanism provided by the present embodiment can realize the series of products in the same platform with different flow and from the medium pressure to high pressure by adjusting the plungers in one platform.

The present application, on the other hand, provides a slider crank mechanism which can replace the traditional crank connected rod mechanism as the core institution, which can reduce the volume and weight of the whole plunger pump and achieve the complete balance of the reciprocating motion inertia force, particularly, the plunger moves sinusoidally which can achieve the nearest cooperation between the plunger and the compressed liquid, it makes a further improvement of the pump's efficiency under the circumstance that the efficiency of the slider crank mechanism itself is higher than the crank connected rod mechanism.

The present application, on the other hand, provides a slide block for the slider crank mechanism, comprising the slide block body and the annular outer ring which is fitted over by the peripheral region of the slide block body; The slide block body is a cylinder with two opposite end surfaces and the peripheral surfaces, which is provided with a circular through bore penetrating through the two end surfaces, the central axis of which is parallel to the central axis of the slide block body, which is the eccentric circular bore; Wherein, the slide block body is the split structure, the subdivision surface passes through the central of the eccentric circular bore which divides it into two identical half bores, the two parts which are divided from the slide block body are the first section and second section respectively; the first section is provided with an assembly bore which is opened on the subdivision surface is the first section assembly bore; the relevant position between the second section and the first section of the assembly bore is provided with a through bore which is penetrating from the second section of the subdivision surface to the peripheral surface. When an operator assembles, the assembly bore of the first section aligns with the through bore of the second section, the connector penetrates the through bore and screws into the relevant assembly bore of the first section, which fits the two parts dividing from the slide block body into one piece. The slide block body is the separated structure which is easy to be fitted on the unsplit crankshaft, and in the peripheral region of the slide block body is provided with an annular outer ring to prevent the abrasion of the slide block during working, which provides the continuous peripheral surfaces in the peripheral region of the slide block and refrains damages to the interface from the direct contact between the external contour of the through bore in the slide block body and the internal region of the slide block accommodation bore or the bearing located in the internal region in the reciprocating motion part; especially for the high-powered internal combustion engine, the compressor and the plunger pump, a needle roller bearing is always provided in the internal region of the slide block accommodation of the reciprocating part, but if the external contour of the through bore in the separated slide block body directly contact with the needle roller bearing, it will cause damages to the needle roller bearing, which will affect the service life and stability of the device. The slide block provide in the present application can avoid this kind of problem; in addition, the slide block is provided in the form of combination the slide block body with the annular outer ring, which will be possible for the slide block body and the annular outer ring to respectively choose different texture or operate individual fabrication process, for example, because the annular outer ring needs to friction contact with the reciprocating part, it can choose the texture with high abrasion resistance to manufacture the annular outer ring, and it can also conduct a special progress to the annular outer ring to make further improvement of the abrasion resistance.

In addition, the present application, on the other hand, provides a slide block group, including at least two slide blocks, each of the slide blocks adopts the slide block said above, the adjacent slide blocks are arranged at the angle of 180 degree, in the adjacent slide blocks, wherein the first section of one slide block and the second section of another slide block are fixed into one piece. It can overcome the livability point phenomenon during rotating under the action of the centrifugal inertia force by the combination of the multiple slide block groups, and it is simple and convenient to assemble the slide block group. In addition, the slide block group can improve the balance performance of the slide crank mechanism during working.

The present application, on the other hand, provides a reciprocating plunger pump engine body which is the three separated structure, including the crankcase upper cover, the bearing seat of the crankshaft provided with a slip way for guiding the upper section of the plunger (also known as the oriented track) and the engine seat, the three parts are fitted into one piece by the connector which not only simplifies the manufacture of the engine seat but also makes the assemble and disassemble easier; at the same time, it also improves the stiffness and intensity of the engine body by the bearing seat specially arranged inside of the crankcase;

The present application, on the other hand, provides a bearing seat, comprising the bearing seat body which is provided with the oriented track and the half bearing seat bore located on the bearing seat body, the bearing seat provided in the present application divides the bearing bore for supporting crankshaft into two half bores, wherein one of the half bores is the half bore located on the bearing seat of the present application, the relevant engine body is provided with the other bore, which simplify the manufacturing process of the engine body and make the assemble and disassemble of the whole engine as well as the manufacture and maintenance easier when the amount of the crank throw of the crankshaft is up to two or more. In addition, the bearing seat of the present application is provided with the oriented track for penetrating the reciprocating part or providing guidance for the part which is penetrating through the crankcase, therefore there is no need to setup the oriented track independently in the other position of the engine body.

The present application, on the other hand, provides a plunger seat, comprising the plunger seat body and the two guide section provided on the two ends of the plunger seat body which is provided with the oriented surface on the side, it achieves the guidance to the reciprocation motion of the plunger seat by the oriented surface specially provided on the guide section, the guide mechanism is located on the relevant engine body which is relevant to the guide section, the plunger seat of the present application has a simple structure which is easy to machine. In the reciprocating part of the traditional slider crank mechanism, the guide mechanism for the reciprocating part is always located on the two sides of the accommodation bore of the slide block, that is the waist zone of the of the reciprocating part, the reciprocating part mechanism relevant to the engine body needs to be provided inside of the crankcase, it increases difficulty to manufacture the engine body and machine the whole engine cause it has to provide crankshaft and reciprocating part body in the crankcase; however, in the present application, the guide section of the plunger seat extends out from the plunger seat body, there is no need for the guide mechanism of the plunger seat located in the relevant engine body to consider the arrangement inside of the crankcase, which simplifies the manufacturing process of the relevant whole body.

DETAILED DESCRIPTION OF THE PREFERRED EMBODIMENTS

Figure 1:
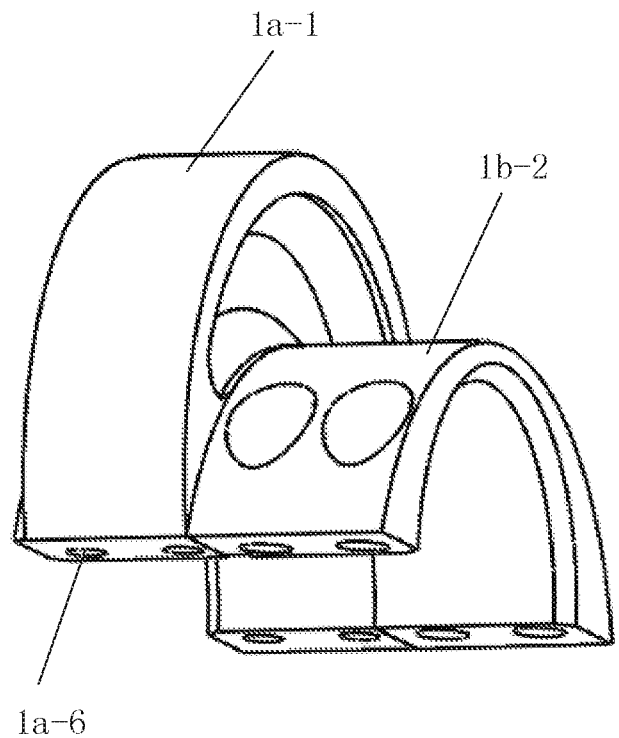
FIG. 1 to FIG. 6 show the schematic view of the slide block in the slider crank mechanism applying the present plunger pump in the embodiment.

The present invention may be more completely understood in consideration of the following detailed description of various embodiments of the present application. The present application may be employed in various and numerous embodiments, those skilled in the art can take on various modifications and alterations without departing from the spirit and scope of the present application, accordingly, the embodiments of the present application are not to be limited to the following described embodiments.

In the following embodiment, reference is made to the accompanying drawing in which is shown an illustrative embodiment of the plunger pump of present application from which its features and advantages will be apparent.

In the present embodiment, the plunger pump is including motion transformation mechanism of the slider crank mechanism, the plunger pump body and the pump head.

Wherein, the slider crank mechanism is including the slide block, the crankshaft and the reciprocating part. Reference is made to the accompanying drawing to make detailed description of all parts and their assembly relationship. It should be noted that the protective scopes of the claims are not limited to the following detailed description of the embodiment, those skilled in art may conceive various variations, modifications and alterations without departing from the protective scopes of the claims upon the instruction of the embodiment of the present application.

FIG. 1 to FIG. 6 show the schematic views of the slide block in the slider crank mechanism applying in the present embodiment.

In the slider crank mechanism, the crankshaft and the reciprocating part (such as the piston) are connected by the slide block which is an indispensable component for transformation between the reciprocating motion and rotation motion. However, the slide block has different construction in different application scenarios. Please refer to FIG. 1 to FIG. 6, the slide block group which is formed by the double slide blocks is applied in the present embodiment. The double slide block group is formed by two slide blocks in the phase of 180. As shown in FIG. 6, the slide block group comprises the first slide block 1a and the second slide block 1b, the two slide blocks are connected into one piece in the phase of 180.

Each slide block of the slide block group is a cylinder with two opposite end surfaces and the peripheral surfaces, the slide block is provided with a circular through bore penetrating through the two end surfaces, the central axis of which is parallel to the central axis of the slide block body, which is the eccentric circular bore. In the two slide blocks, each of the slide block is including the slide block body of split structure and the annular outer ring which is fitted over by the peripheral region of the slide block body; the two parts which are divided from the slide block body are the first section and second section respectively; the two parts are connected into one piece by a bolt, and outside of the construction formed by the two parts is fitted over by the annular outer ring, the two divided parts and the complete slide block formed by the annular outer ring.

Please refer to the FIG. 6 continually, take the slide block 1a for instance, the slide block 1a is an oblate cylinder provided with a circular peripheral surface which is cooperated with the accommodation bore of slide block provided on the reciprocating parts (such as the piston or the dynamic balance slide block or the plunger seat). When the slide block is located in the accommodation bore of the slide block, they can be slip fitted. Certainly, the slide block 1a will cooperate with the internal peripheral surface of the sliding bearing or the rolling bearing when the accommodation bore of the slide block in the reciprocating part can be provided with the sliding bearing or the rolling bearing.

The slide block 1a is provided with two opposite end surfaces and a circular through bore penetrating through the two end surfaces which is the eccentric circular bore 1a-3. The central axis of the eccentric circular bore 1a-3 is parallel to the central axis of the slide block 1 but not overlapped with it.

The distance of the central axis of the eccentric circular bore 1a-3 deviating from the slide block 1a is the eccentric distance which can be decided according to the course of the reciprocating part. The eccentric circular bore 1a-3 is a circular through bore used for accommodate the crankpin of the crankshaft part with the size that the crankpin can be slip fitted the eccentric circular bore or cooperate with the internal peripheral surface of the sliding bearing or the rolling bearing after the eccentric circular bore is provided with the sliding bearing or the rolling bearing.

In addition, at least one end of the slide block 1a is provided with a weight reducing slot. In the embodiment, take the slide block 1a provided with the weight reducing slots 1a-4 at the two ends of it for instance to illustrate. The weight reducing slots 1a-4 are provided by the two ends of the slide block 1a, which forms a groove between the two opposite end surfaces toward the inner side of the slide block 1a. The positions of the weight reducing slots 1a-4 located in the two ends of the embodiment are relevant to each other with the same shape.

One of the functions of the weight reducing slots 1a-4 is to reduce the weight of the whole slide block 1a to have less rotating mass when the slide block 1a applies into the motion transformation mechanism of the slider crank block. In addition, the weight reducing slots 1a-4 has the function of adjusting the gravity center position of the slide block 1a, which will make the gravity center of the slide block 1 to be close to or overlapped with the geometrical center of the peripheral surface of the slide block 1.

The weight reducing slot 1a-4 is provided with various shapes, in the embodiment, the section formed by the weight reducing slot 1a-4 provided perpendicular to the center axis of the slide block 1a is in a shape of the crescent.

The section of slide block along the axis direction is provide with the structure of I shaped which makes the slide block has the higher rigidity, which can endure more stress and is hard to deform during working.

Figure 4:
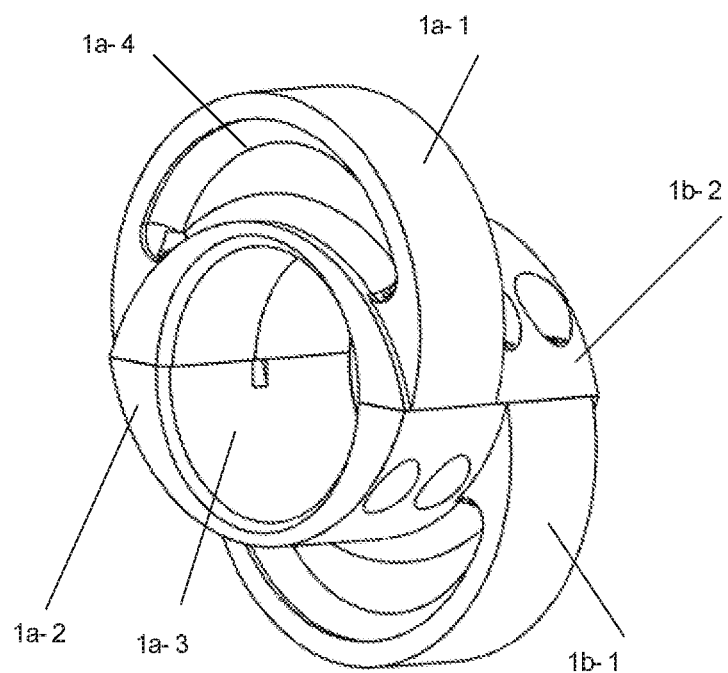
Figure 5:
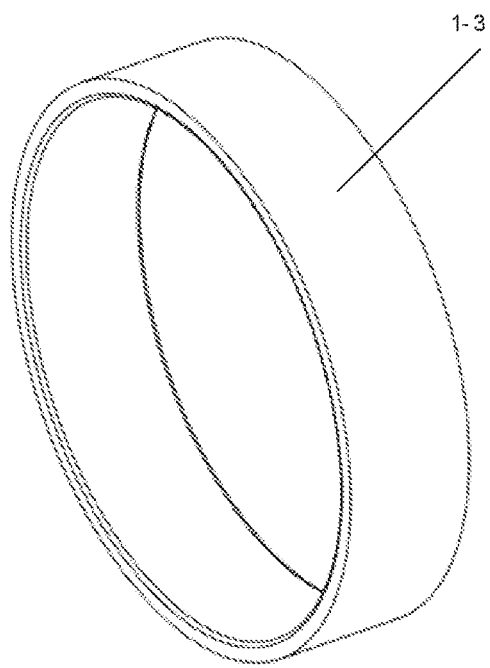
Figure 6:
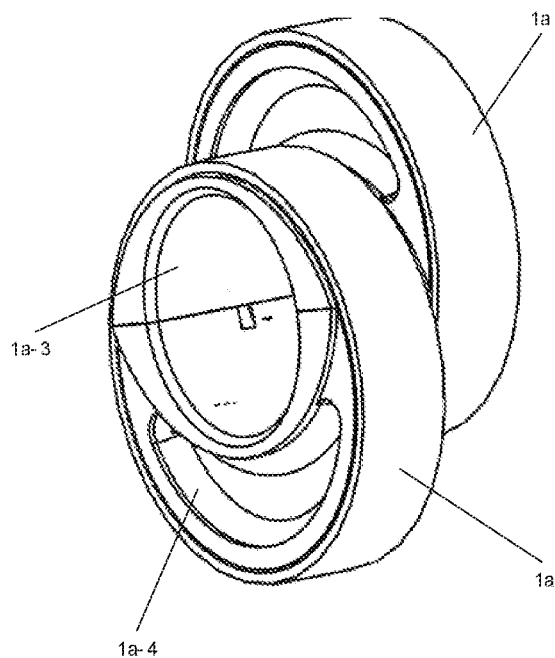

In the present embodiment, the slide block 1a is divided into three parts, including the annular outer ring 1-3 shown in FIG. 5 and the slide block body with split structure provided inside of the annular outer ring, the slide block body is subdivided into the first section 1a-1 and the second section 1a-2. And the subdivision surface passes through the center of the eccentric circular bore 1a-1 which divides it into two half bores, both of the first section 1a-1 and the second section 1a-2 are provided with a half bore. The divided two parts are fitted into one piece as the slide block body shown in FIG. 4, wherein, the FIG. 4 shows the circumstance that the two slide blocks are fixed into one piece.

In the embodiment, the subdivision surface in the slide block body is the one which is perpendicular to the surface on which the central axes of the eccentric circular bore 1a-3 and the slide block 1 (the two axes are parallelly provided under the consideration of no fabrication errors) are located. Certainly, there are some other choices for the subdivision surface, no more tautology here.

Figure 2:
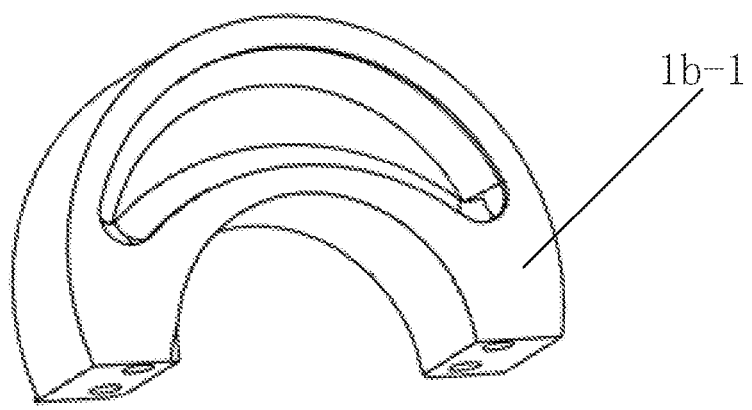
Figure 3:
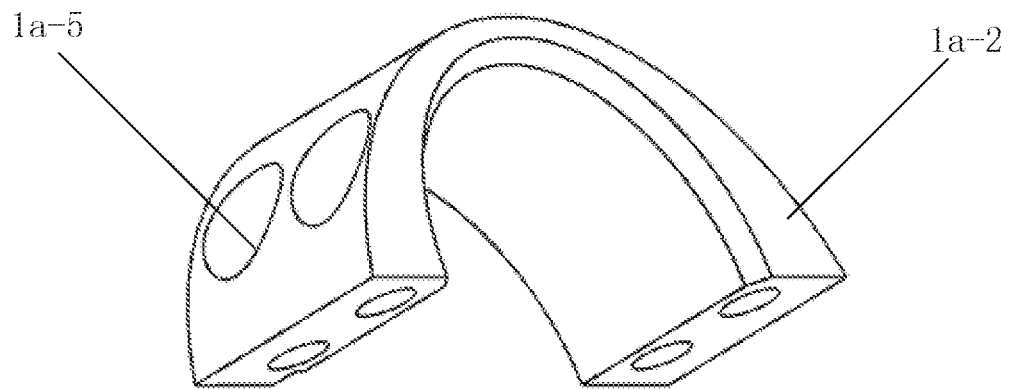

Please refer to FIG. 1 to FIG. 3, the first section 1a-1 is provided with a screwed bore 1a-6 opened on the subdivision surface as shown in FIG. 1 and FIG. 2. The screwed bore 1a-6 is used to connect the first section 1a-1 with the second section 1a-2 as shown in FIG. 3 into one piece with cooperation with the connector. In the present embodiment, the amount of the screwed bores is four and they are located on the two sides of the half bore of the first section in symmetry.

Please refer to FIG. 3, the relevant position on the second section 1a-2 and the screwed bore 1a-6 is provided with a through bore 1a-5. Wherein, the through bore 1a-5 penetrates from the subdivision surface of the second section 1a-2 to the peripheral surface section.

When an operator assembles it, he connects the first section 1a-1 with the second section 1a-2 along the subdivision surface, and makes the relevant screwed bore 1a-6 align with the through bore 1a-5, and a circular through bore 1a-3 is formed after the joint between the half bores of the first section 1a-1 and the second section 1a-2 as shown in FIG. 4.

Please refer to FIG. 4 continually, an operator inserts the connector from the peripheral region of the second section 1a-2 into the through bore 1a-5 and part of it penetrates through the through bore 1a-5, afterwards, screws it into the relevant screwed bore 1a-6, the first section 1a-1 and the second section 1a-2 are fixed tightly into one piece after tightening.

In the present embodiment, the connector is the bolt, the through bore 1a-5 is the stepped bore, and the diameter of the through bore 1a-5 close to the end of the peripheral surface of the cover section is larger, the end with larger diameter is used to accommodate the head of the bolt, thereby the head can enter into the through bore 1a-5 completely after the bolt screwing into it, which can prevent the bolt from standing out of the peripheral surface of the slide block 1 and the damaging the motion transformation mechanism formed by the slide block 1 and the piston. On the other hand, it can also make sure that the annular outer ring 1-3 could be fitted out of the slide block body. In the present embodiment, at least one of the bolts can be the locating bolt.

In addition, it can also have the looseproof structure when fastening the first section 1a-1 and the second section 1a-2 by the bolt, for examples, it can ensure the split structured slide block 1 to work reliably by fitted a check washer over by the bolt.

It will form the slide block body after fitting the first section 1a-1 and the second section 1a-2 into one piece. Out of the slide block body is fitted over by the annular outer ring 1-3 as shown in FIG. 5, wherein, the annular outer ring 1-3 is interference fitted with the slide block body.

In the present embodiment, the slide block 1 is subdivided into the first section 1a-1 and the second section 1a-2 and the two parts are connected into one piece by the connector-the bolt, and out of it is fitted over by the annular outer ring 1-3 which forms a complete slide block 1. The two parts of the slide block can be machined respectively, which the processing and assembling is simple; in addition, it is convenient to assemble with the integrative crankshaft when the slide block assembles with the crankshaft and some other parts: insert the crankshaft's crankpin into one part of the semicircular construction after disassembling the two parts of the two slide block 1, and connect the other part with the foregoing part into one piece. That is, the slide block 1of the present embodiment is easy to assemble with the integrative crankshaft, it can improve the flexibility and convenience during assembling, which is also easier for the mechanism including the slide block 1 to disassemble and maintain.

The slide block body is fitted over by annular outer ring 1-3, therefore the peripheral region of the slide block body is provided with the continuous peripheral surfaces, which refrains damages to the interface from the direct contact between the external contour of the through bore in the slide block body and the internal region of the slide block accommodation bore or the bearing located in the internal region in the reciprocating motion part; especially for the high-powered internal combustion engine, the compressor and the plunger pump, a needle roller bearing is always provided in the internal region of the slide block accommodation of the reciprocating part, but if the external contour of the through bore in the separated slide block body directly contact with the needle roller bearing, it will cause damages to the needle roller bearing, which will affect the service life and stability of the device. The annular outer ring 1-3 provided in the present application can avoid this kind of problem; in addition, the slide block is provided in the form of combinating the slide block body with the annular outer ring 1-3, which will be possible for the slide block body and the annular outer ring to respectively choose different texture or operate individual fabrication process, for example, because the annular outer ring needs to friction contact with the reciprocating part, it can choose the texture with high abrasion resistance to manufacture the annular outer ring, and it can also conduct a special progress to the annular outer ring to make further improvement of the abrasion resistance.

In addition, for the slide block body, the first section 1a-1 and the second section 1a-2 can also be provided with the locating structure: for example, a location bore penetrating the junction surface after the assembly of the first section 1a-1 and the second section 1a-2 or a location pin inserting into the location bore; or a dovetail convex falcon provided on the junction surface located on any of the two parts subdivided from the slide block and a dovetail slot provided on the relevant position of the other part as well as cooperated with the dovetail convex falcon; or an internal spigot provided on the junction surface located on any of the two parts subdivided from the slide block and an external spigot provided on the relevant position of the other part as well as cooperated with the internal spigot; or provide the subdivision surface of the two parts in the shape of groove, certainly, there are some other locating structure, there is no need to enumerate all of it here.

In addition, there is a bulge along at least one end of the surface of the eccentric circular bore 1a-3 in the slide block 1, the bulge will also be subdivided into two parts after subdivision which locate respectively around the half bore of the first section 1a-1 and the second section 1a-2. The screwed bore and the through bore in the above embodiment can be located respectively on the bulge, and will not be described in detail again, those skilled in the art can conceive relevant alteration based on the principles of the present embodiment.

It describes the single slide block comprising the annular outer ring and the slide block body in the above description, the following will describe the situation of the slide block group of double slide blocks formed by two single slide block group with the same structure. It should be understood that those skilled in the art can generalize the slide block group of the double slide blocks to the combination of the slide block group of the triple slide blocks or the slide block group of the multiple slide blocks.

As shown in FIG. 4, the two slide block bodies are fitted into one piece at the phase of 180, the eccentric circular bores of the two slide blocks and the partial lines of the relevant ends of the two slide block bodies are in alignment. The detailed fixed method is as follows: the first section 1a-1 of the first slide block 1a is fitted with the second section 1b-2 of the second slide block 1b into one piece, therefore, the second section 1a-2 of the first slide block 1a is respectively fitted with the first section 1b-1 of the second slide block 1b into one piece in the relevant parts by the bolts.

Certainly, the two slide blocks can also be connected into one piece by the connecting pin, that is, to provide at least two pin bores which are symmetry to the center of the eccentric circular bore around at least one end surface of the eccentric circular of the slide block body. Wherein, the pin bore is a blind bore and disconnected with the screwed bore and the through bore (not marked). The central axes of the pin bore and the eccentric circular bore share the same surface. At the subdivision slide block body, the pin bore is also subdivided into two parts by the subdivision surface of the slide block which forms two half pin bores, respectively located on the first section and the second section, the two half pin bores are connected into the complete pin bore after the two sections are connected into the complete slide block body. It will form the slide block group constituted by the double slide blocks when the two slide block are connected into one piece and the relevant pin bores are in alignment and the locating pin of the slide block is inserted into the pin bore.

Figure 7:
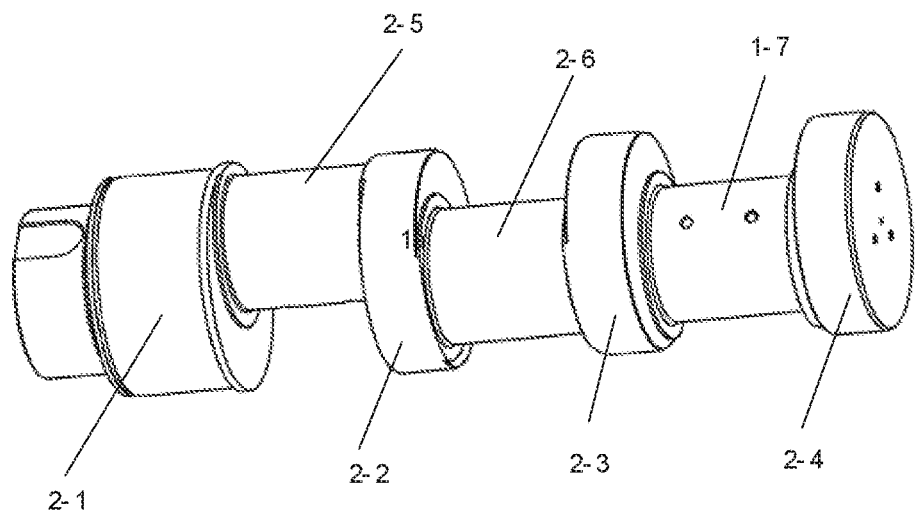
FIG. 7 is the schematic view of the crankshaft in the plunger pump applying the present plunger pump in the embodiment.

Please refer to FIG. 7, which is the schematic view of crankshaft in the plunger pump applying in the present embodiment, the crankshaft 2 is of three-throw four-supported structure including the main journals 2-1 and 2-4 located on the two ends and the two crank arms 2-2 and 2-3 located between the two main journals, the adjacent main journals and crank arms as well as the adjacent two crank arms are connected by three crank pins (respectively are the crank pins 2-5, 2-7 and 2-6). In the present embodiment, the crankshaft 2 is integrative, the above said parts which constitutes the crankshaft is the function parts of the integrative crankshaft 2 in the above mentioned FIG. 7. In the present embodiment, the crank pin 2-5, 2-7 and 2-6 is located along the circumferential interval at the angle of 120 degree. Certainly, the crank pins can be provided in some other methods, for example, the three crank pins can be located in the same straight line or at the angle of 180 degree, no more tautology here.

Figure 8:
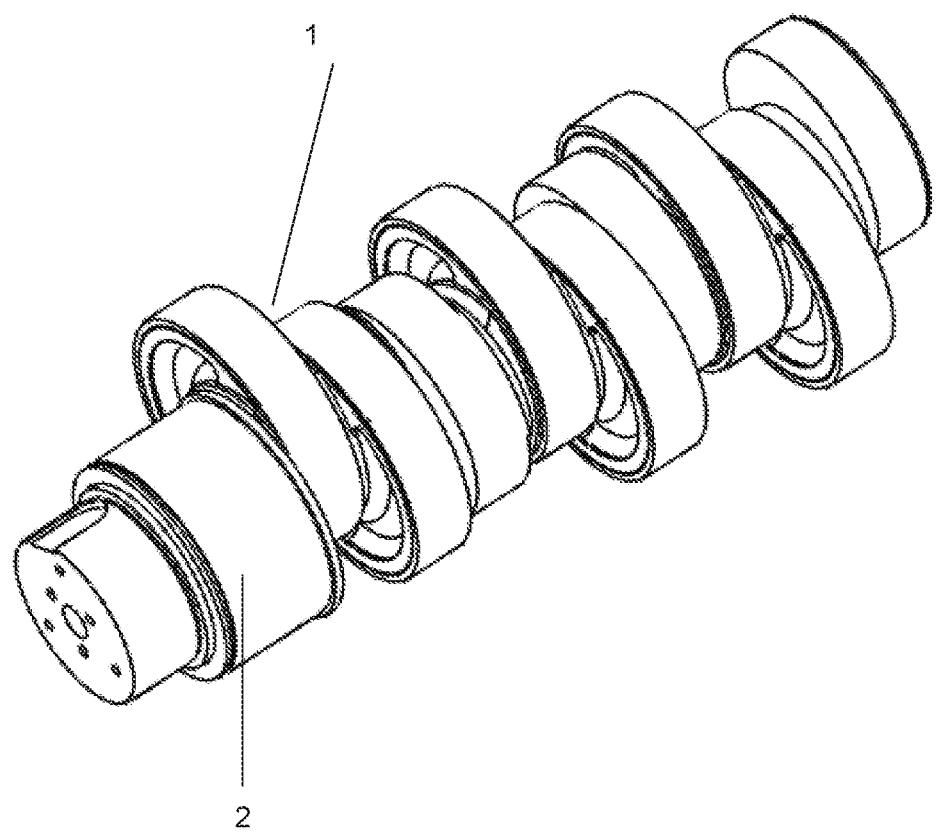
FIG. 8 is the schematic view shown the structure that the crankshaft in FIG. 7 is fitted over by the slide block group.

FIG. 8 shows the situation that the above-mentioned slide block group is fitted over by the crankshaft shown in FIG. 7, as shown in FIG. 8, each of the crankpin is fitted over by an above-mentioned slide block group, each of the slide block group is including two slide blocks provided at the phase of the 180 degree. Since it adopts the integrative crankshaft, the above-mentioned the slide block body in the separated slide blocks can be easily fitted over by the crankshaft's crankpin, and the annular outer rings of all slide blocks are fitted over by the peripheral region of the relevant slide block body by the main journals at the two ends. Certainly, the inner circle size of the annular outer ring is bigger than external diameters of the crankshaft's main journal and crank arm, no more tautology here.

The slider crank mechanism in the present embodiment also comprises the reciprocating part which is including the plunger seat of the plunger pump and the plunger located on the plunger seat. The plunger is the working section of the plunger pump.

Figure 15:
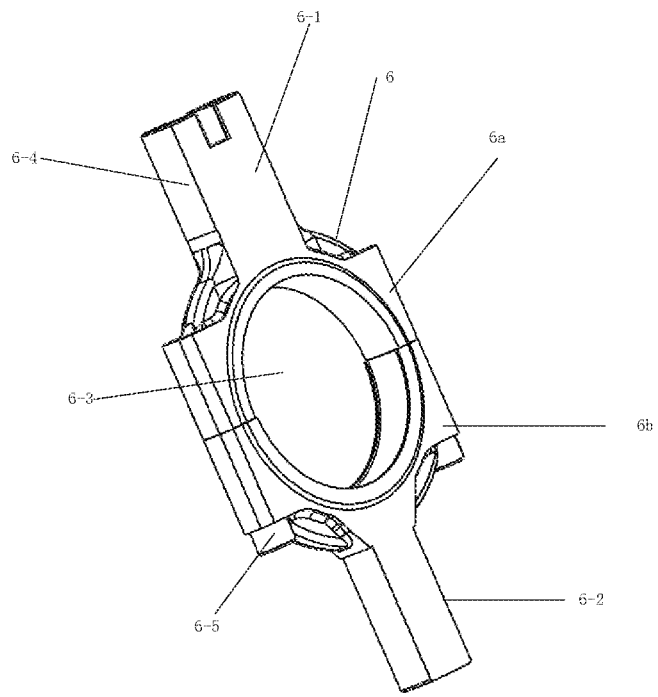
FIG. 15 is the schematic view of the structure of the plunger pump in the embodiment.

Please refer to FIG. 15, which is the schematic view of the structure of the plunger pump in the embodiment. In the present embodiment, the plunger seat 6 is including the plunger seat body provided with the accommodation bore of the slide block 6-3 and two guide sections formed by two opposite ends of the plunger seat body extending outwards, which are the first guide section 6-1 and the second guide section 6-2 respectively, and the axial directions of the two guide sections along the direction of the motion of the plunger seat are overlapped, there is the oriented surface provided on the two opposite sidewalls of the guide section. In addition, in the present embodiment, both of the first guide section 6-1 and the second guide section 6-2 are connected with the crown 1 into one piece.

The accommodation bore of the slide block 6-3 is a circular through bore whose diameter is bigger than the slide block's which is provided inside so that when the slide block assembles into the accommodation bore of the slide block 6-3, the slide block can rotate relatively to the plunger seat, therefore, it can drive the crankpin provided in the eccentric circular bore of the slide block to rotate. To improve the abrasion resistance, it can process the internal surface of the accommodation bore of the slide block 6-3 with special treatment to form the wearable surface or provide a sliding bearing on the internal surface, such as the bearing bush. To reduce friction, it can also provide a rolling bearing in the inner wall of the accommodation bore of the slide block 6-3, such as the needle bearing, to reduce the friction during the slide block rotating. Certainly, it can also adopt some other measures to improve the abrasion resistance of the accommodation bore of the slide block and reduce the friction, there is no need to list all of them one by one here. For the plunger seat in the present embodiment, the inner wall of the accommodation bore of the slide block 6-3 is provided with the needle bearing.

Both of surfaces of the two opposite outer sidewalls of the first guide section 6-1 and the second guide section 6-2 are provided with the oriented surfaces which can be the plane, convex surface or the concave surface. In the present embodiment, all the oriented surfaces are provided in bulging cylinder arc which is cooperated with the oriented sidewall provided in the relevant position in the plunger pump body, so that when the plunger seat is fitted into the engine body, it can be sliding fitted with the relevant oriented sidewall of the engine body to be in reciprocating motion along the oriented sidewall towards the sidewall.

The first guide section 6-1 and the second guide section 6-2 can be in some other shapes, for example, the complete or partial peripheral surface of the cylinder can be the guide surface if they are in the shape of the cylinder.

Figure 16:
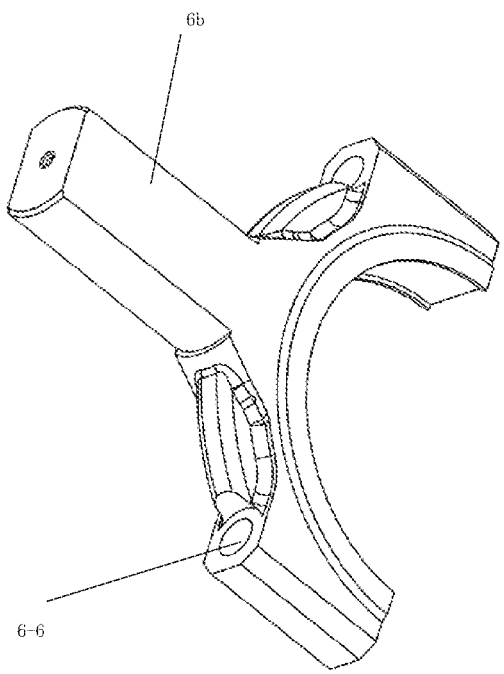
FIG. 16 and FIG. 17 are respectively the structure view of the upper section and lower section of the plunger pump showing in FIG. 15.
Figure 17:
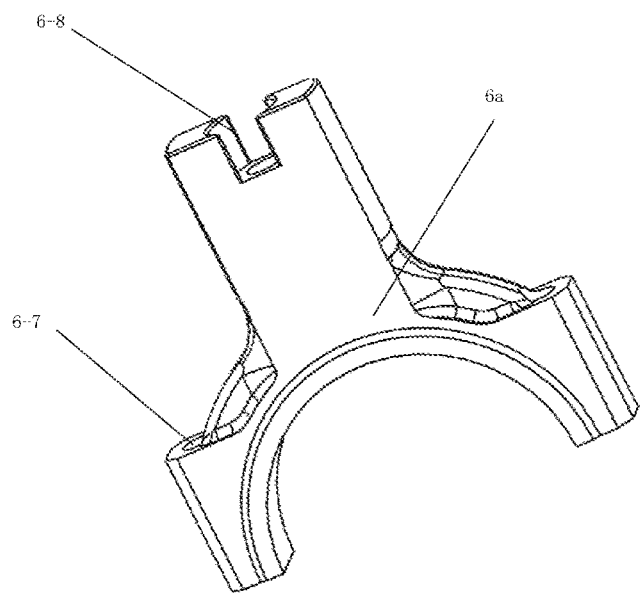

In the present embodiment, the surface of the plunger seat 6 along the accommodation bore of the slide block 6-3 is subdivided into two parts which are respectively the upper half section 6a and the lower half section 6b, FIG. 16 and FIG. 17 shows the structures of them. The accommodation bore of the slide block 6-3 is subdivided into two half bores.

There are the through bores which are penetrating the two guide sections provided on the plunger seat 6 body and at the same time on the two opposite sides of the accommodation bore of the slide block 6-3, which are the through bore 6-1 located on the upper half section 6a and the through bore 6-6 located on the lower half section as shown in FIG. 16 and FIG. 17. When the upper half section 6a and the lower half section 6b are connected into one piece, the relevant through bores are in alignment and both of them are connected into one piece by the connecting bolt. Wherein, the moving direction of the through bores are corresponding with reciprocating motion direction, which avoids the connecting bolt to endure the shear force from the non-reciprocating motion direction when the plunger seat is in the reciprocating motion which leads to the out-of-roundness of the accommodation bore of the slide block 6-3 to ensure the stability of the mechanism's working.

In the present embodiment, the outer end of the first guide section 6-1 (namely the one away from the accommodation bore of the slide block 6-3) is provided with a plunger connecting mechanism 6-8 for connecting with the plunger of the plunger pump.

In the present embodiment, the plunger seat is provided in separated structure which is easy to be connected with the above-mentioned crankshaft and slide block into one piece, and the structure of the plunger pump engine body can be further simplified since the plunger seat can be separated assembled. In addition, the separated plunger seat's manufacturing process is simplified which is easy to manufacture.

In addition, the guide mechanism in the plunger seat of the present embodiment is different from the reciprocating motion guide mechanism in the current slider crank mechanism, the guide mechanism in the present embodiment is located in the two ends of the plunger seat body and guiding by the two coaxial guide sections, so that there is no need to provide relevant oriented sides on the position relevant to the plunger seat body on the engine body. That is to say, the plunger seat in the present embodiment not only provides double orientation but also makes the processing arrangement of the engine body which is suitable with the plunger seat easy to manufacture the tracks on the engine body.

In addition, in the present embodiment, there are some other structures on the plunger seat, such as the lubricant groove and the reinforcing rib and so on, no more tautology here.

The above-mentioned plunger seat is provided on the slide block shown in FIG. 8, each of the slide block is fitted over by a plunger seat, the double slide blocks in the slide block group is in the phase difference of 180 degree, therefore, the axial direction of plunger seat fitted over on the two slide blocks of the slide block group (the axial direction here is the reciprocating motion direction along the plunger seat) is at the angle of 90 degree which is the half of the phase difference of the double slide blocks in the slide block group. There are three groups of 6 slide blocks in the present embodiment, therefore, it needs 6 plunger seats to cooperate with it, each plunger seat is provided with a plunger, which constitute the slider crank mechanism with six working heads.

Figure 13:
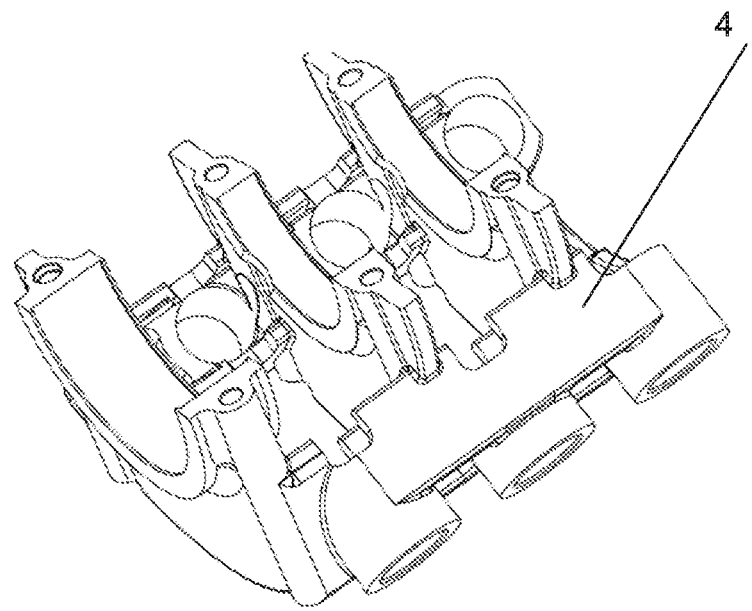
Figure 14:
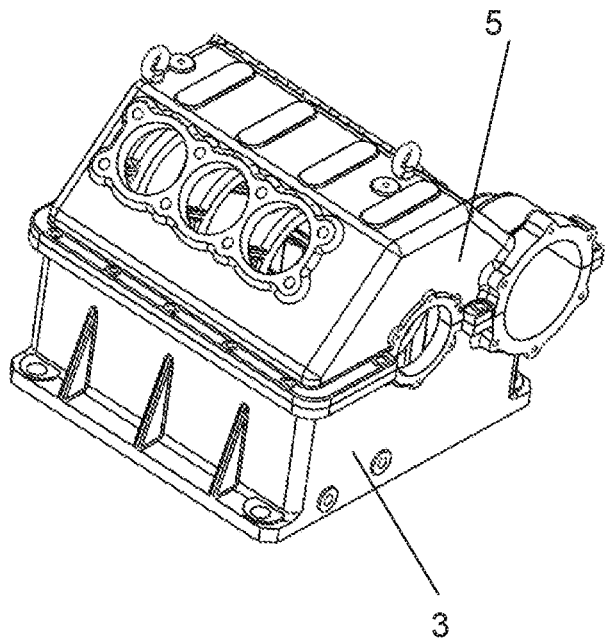
FIG. 14 is the structure view of the engine body in the plunger pump embodiment of the present application.

FIG. 14 shows the engine body structure of the plunger pump in the present embodiment, as shown in FIG. 14, the plunger pump engine body comprises the engine seat 3 and the crankcase upper cover 5 located on the engine seat 3, the internal spaces formed by the engine seat 3 and the crankcase upper cover 5 are provided with the bearing seat 4 as shown in FIG. 13, the following is the detailed description to each part and the assembling relationship between each part in combination with the figures.

Figure 11:
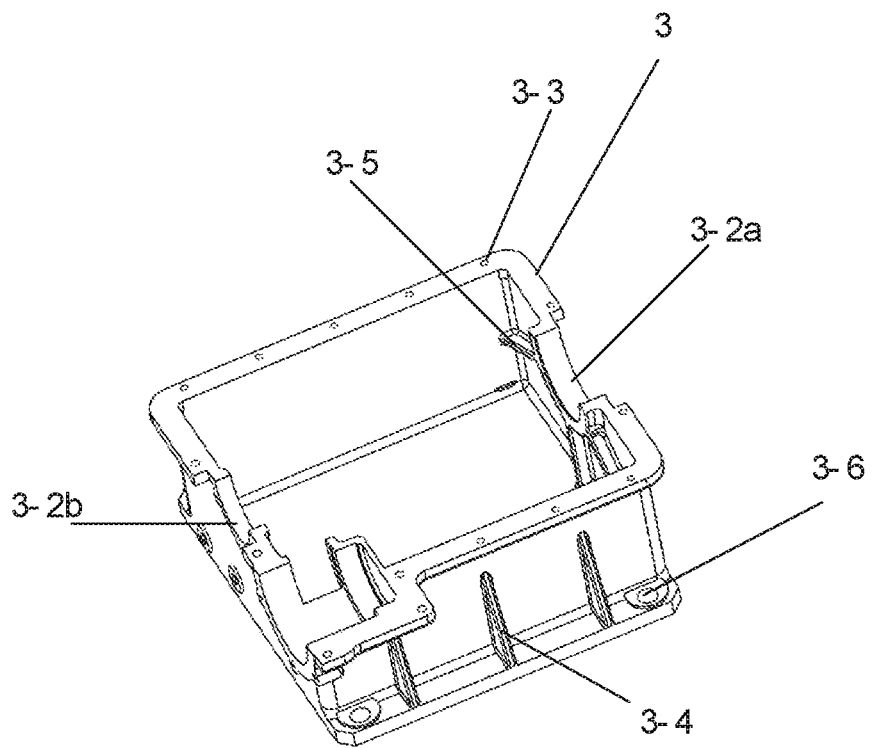
FIG. 11 is the schematic view of the structure of the engine body's engine seat in the plunger pump embodiment of the present application.

Please refer to FIG. 11, which is the view of the structure of engine seat 3 which constitutes the above-mentioned engine body. In the present embodiment, the engine seat 3 comprises a bottom wall and a sidewall which is integrative provided with the bottom wall extending from the edge of the bottom wall towards the surface away from the bottom wall. In the present embodiment, the bottom wall is in the shape of the rectangle approximately. The sidewall consists of two pairs of sidewalls which are against to each other, which are respectively the left sidewall, the right sidewall, the front sidewall and the rear sidewall.

The relevant position on the left sidewall and the right sidewall which is close to the roof of the sidewall is respectively provided with two half bores 3-2a and 3-2b, which are the upper half bores of semicircular bores and used for constituting the through bore of the crankshaft of the plunger pump together with the combinations of half bores on the crankcase upper cover, the power input shaft of the crankshaft stretches out from the through bore and connects with output shaft of the power driven apparatus such as the electric machine and the internal combustion engine. Wherein, the half bore 3-2a and the relevant half bore on the crankcase upper cover also constitute the bearing bore of the crankshaft.

To improve the intensity of the engine seat, in the present embodiment, the corner formed by the sidewall and the bottom wall is provided with the reinforcing rib 3-4 in the shape of the triangle, it is provided with the reinforcing rib 3-5 which is arranged radially around the two half bores 3-2. The reinforcing rib can be provided on the inner side or the outer side of the sidewall, which is not limited here. The outer edge of the bottom wall is provided with a fixing bore 3-6 which is fixed with the base, the fixing bore 3-6 is a circular through bore and also could be a screwed bore.

The roofs of all the sidewalls are provided with the outward flanging, the upper surfaces of the outward flanging are or approximate on the same plan and constitute the assembling surface in the assemble of the engine seat 3 with the crankcase upper cover 5. The flanging is provided with several through bores 3-3 as the assembly bores. Certainly, the upper surface of the flanging of different sidewall's roofs can be in different shapes and planes, it only needs the relevant crankcase upper cover to be provided with cooperated assembling surface. The engine seat is not only the installation base of the plunger pump engine body but also an oil pan.

Figure 9:
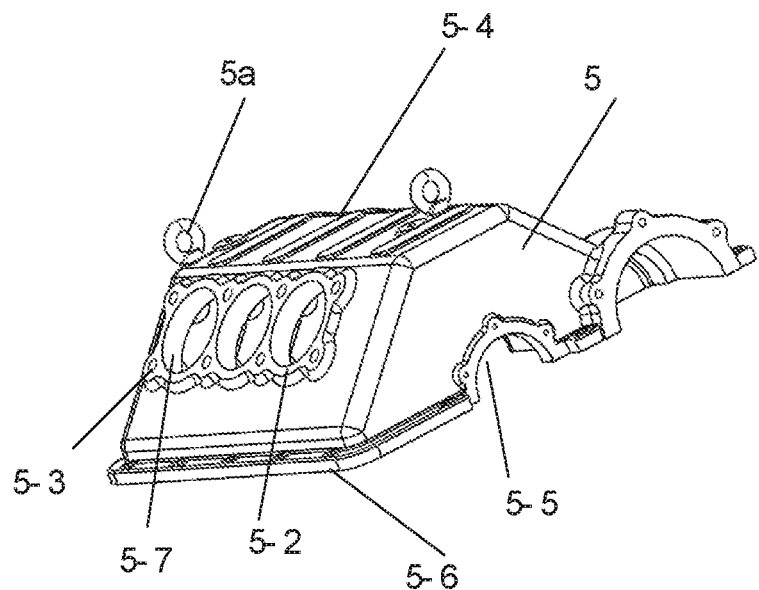
FIG. 9 and FIG. 10 are respectively the first and second schematic views of the structure of the crankcase upper cover in the engine body in the embodiment of the present application.
Figure 10:
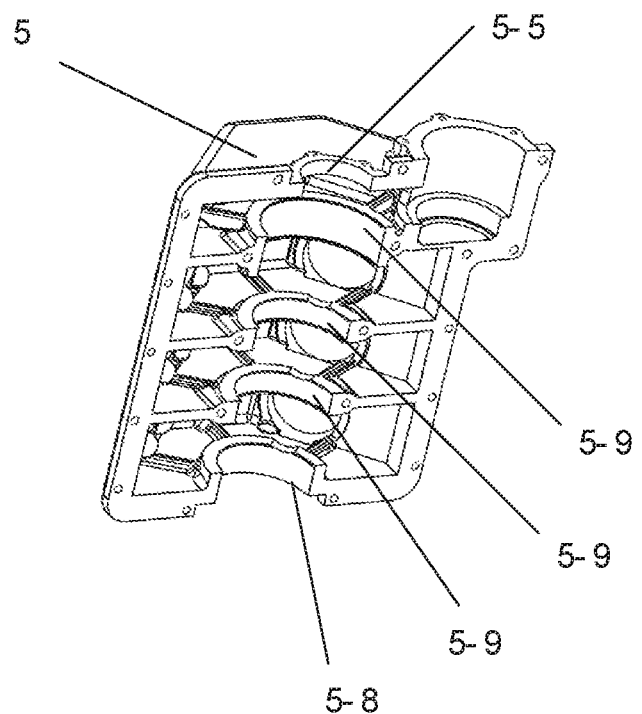

Please refer to FIG. 9 and FIG. 10, which are respectively the first and second schematic views of the structure of the crankcase upper cover in the engine body in the embodiment. The crankcase upper cover 5 is provided with at least an upper wall and a sidewall extending from the two opposite edges of the upper wall towards the surface away from the upper wall, the two opposite sidewalls are respectively provided with half bore 5-5 which is the upper half bore, cooperated with the lower half bore 3-2 in the engine base. The position of the upper half bore is relevant to the lower half bore, when the crankcase upper cover 5 is buckled on the engine base 3, the relevant upper half bore and the lower half bore constitute a whole circular through bore which is the input shaft connection bore for the crankshaft and the output shaft connection bore for the crankshaft extension shaft.

As mentioned above, the plunger pump in the present embodiment is provided with 6 cylinder equipments which are with six plunger seats, the two plunger axial directions in the same slide block group is at the angle of 90 degree, that is in the V-shape, that is to say, the plunger pump in the embodiment is the six cylinder plunger pumps with V-shape. Correspondingly, the crankcase upper cover 5 is respectively provided with the through bore 5-7 for penetrating the plunger seat and the plunger as shown in FIG. 9, the through bore 5-7 is a circular through bore, the through bore 5-3 is provided on the two opposite inclined sidewalls which is integrative with the upper wall of the crankcase upper cover, the internal spaces formed by the upper wall, the inclined sidewall and the sidewall is used for penetrating and accommodating the crankshaft. The through bore 5-7 is respectively located on the two inclined sidewalls along the crankshaft direction, and each side of the inclined sidewalls is provided with three through bores 5-7. The outer side of the inclined wall which is along the circumstance of the through bore 5-7 is provided with the plunger pump head installation seat 5-2 which is provided with the installation matching surface, the pump head assembly bore 5-3 which is screwed bore is provided along the installation seat 5-2.

In the embodiment, the outside of the upper wall is provided with two aided structures 5a for processing which particularly are the circular rings integrative with the upper wall in the present embodiment.

The outside of the upper wall is provided with several reinforcing ribs 5-4 which are arranged in parallel in the present embodiment.

The sidewall and the bottom wall of the inclined sidewall on the crankcase upper cover are provided with the outward flanging, the undersurface of the flanging constitutes the assembly surface of the engine seat, there are several assembly fixing bores (not marked in the figures) provided along the flanging, the assembly fixing bores is relevant to the assembly bore 3-3 in the relevant position of the engine seat.

As shown in FIG. 10, one of the upper half bores on the inclined wall of the crankcase upper cover 5 is provided with the inward flanging 5-8a which constitutes the half bearing bore of the crankshaft, which is the first half bearing bore, it cooperates with the half bearing bore 3-2a on the engine seat and constitutes a complete bearing bore which will place a bearing cooperated with one of the main journals of the crankshaft after it assembles into a plunger pump.

Please refer to FIG. 10 continually, the inner side of the crankcase upper cover 5 is provided with the other three half bearing bores 5-9 which are the second half bearing bores, the second half bearing bore 5-9 cooperates with the half bearing bore on the relevant position of the following bearing seat which constitutes the bearing bore for supporting the crank of the crankshaft and the other main journal. It can be learned from the above description that the first half bearing bore 5-8 and the second half bearing bore 5-9 on the crankcase upper cover 5 are coxially arranged along the trend of the crankshaft, which are relevant to crankshaft's main journal and crank. The second half bearing bore 5-9 and the connecting plate of the upper wall and the inclined sidewall are provided with the radical reinforcing rib, which is used for improving the overall intensity and stiffness of the crankcase upper cover 5.

Figure 12:
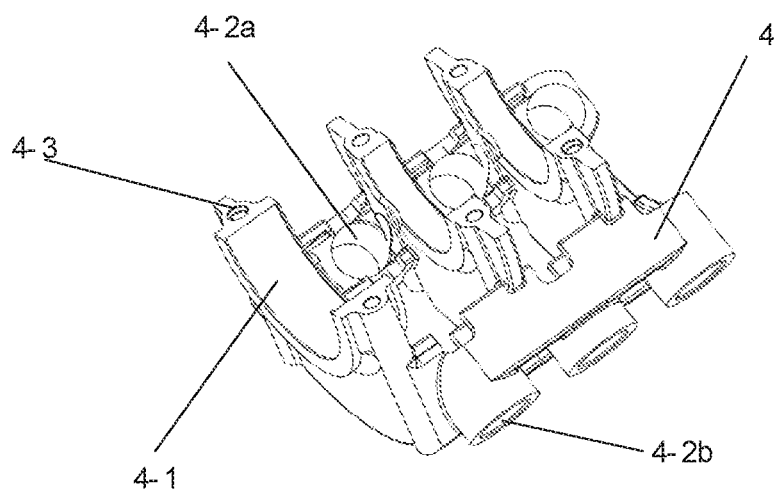
FIG. 12 and FIG. 13 are respectively the first and second schematic views of the structure of the crankshaft bearing seat of the engine body in the plunger pump embodiment of the present application.

Please refer to FIG. 12 and FIG. 13, which are respectively the first and second schematic views of the structure of the crankshaft bearing seat of the engine body in the plunger pump embodiment. In the present embodiment, the crankshaft bearing seat 4 comprises the bearing seat body and the third half bearing bore 4-1 which is provided on the bearing seat body and relevant to the second half bearing bore 5-9, the amount of the third half bearing bores 4-1 are three in total, which are located respectively relevant to the second half bearing bore 5-9, the connecting surface of them is provided with a penetrating opening 4-3 which is relevant to the corresponding opening 5-10 located in the crankcase upper cover, the corresponding openings are cooperated with each other and connected with the crankcase upper cover and the crankshaft bearing seat 4 into one piece, which form a complete bearing bore for providing an effective support for the crankshaft. The three third half bearing bores 4-1 are arranged coaxially along the trend of the crank axis.

In addition, the bearing seat body is provided with the oriented track 4-2 for guiding the second section 6-2 of the plunger seat. In the present embodiment, the through bores 5-7 of the oriented track 4-1 relevant to the plunger seat and the inclined sidewall of the crankcase upper cover are provided with 6, they group in pairs and locate respectively on the two sides of the axis of the third half bearing bore, and perpendicular to the axis of the oriented track on the two sides of the third half bearing bore axis (such as the axes of the third half bearing bore 4-2a and 4-2b are perpendicular to each other).

The inner wall of the oriented track 4-2 is provided with the oriented surface which is cooperated with the second guide section 6-2. The axial direction of the oriented track 4-2 is perpendicular to the axis of the third half bearing bore.

Figure 18:
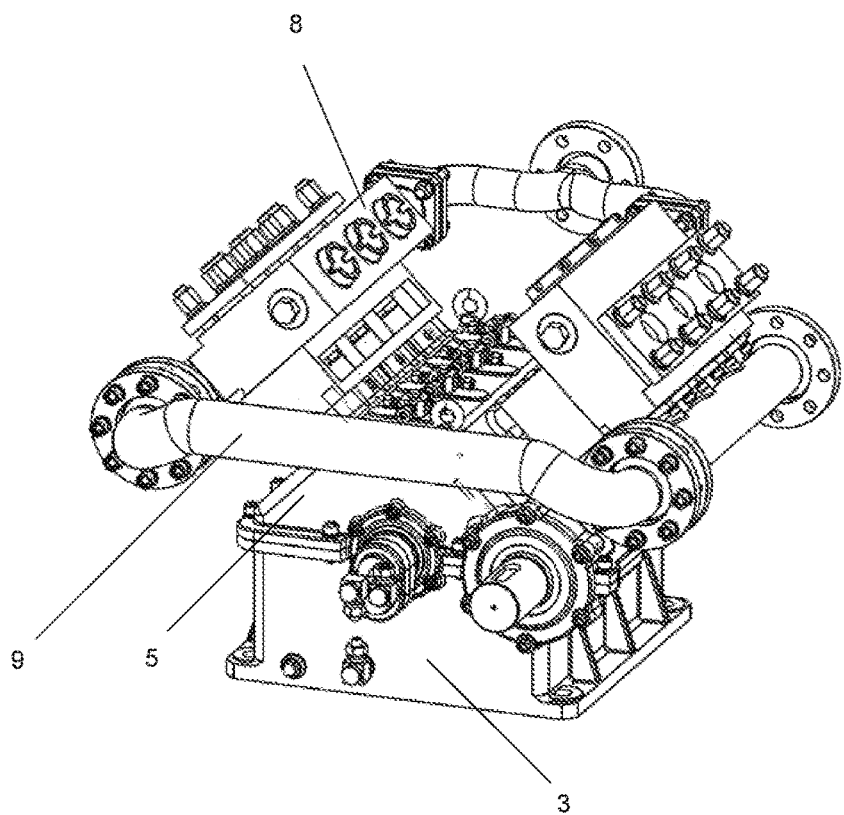
FIG. 18 is the structure view of the plunger pump embodiment in the present application.
Figure 19:
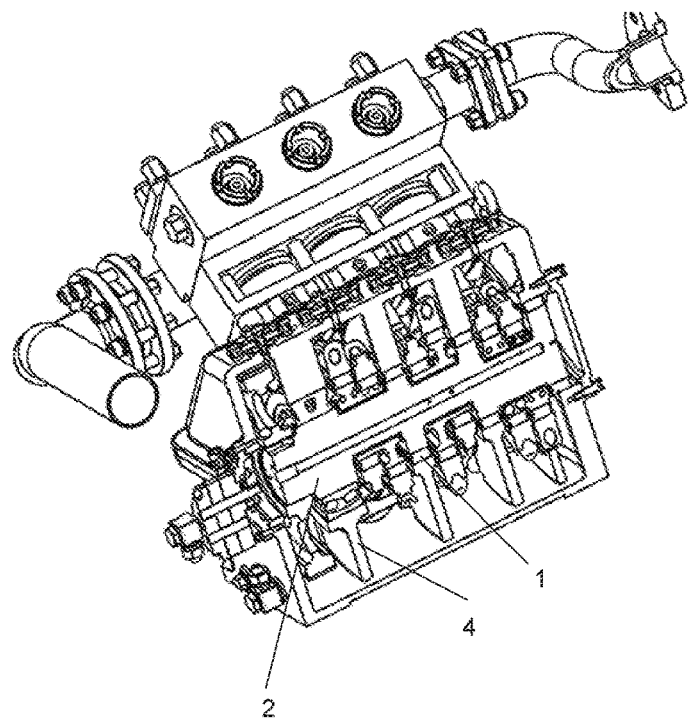
FIG. 19 and FIG. 20 are respectively the section views of the two directions of FIG. 18.
Figure 20:
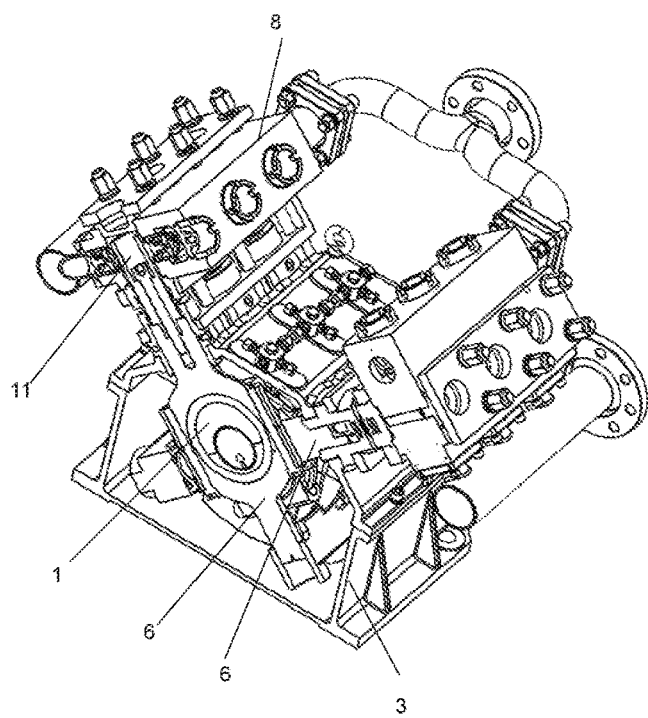

The plunger pump in the present embodiment is including the plunger pump head, FIG. 18 is the structure view of the plunger pump in the present embodiment. FIG. 19 and FIG. 20 are respectively the section views of the two directions of FIG. 18.

Please refer to FIGS. 18, 19 and 20, the engine seat 3 and the crankcase upper cover 5 are buckled together, the bearing seat is provided in the internal spaces formed by the buckling and fixed with the crankcase upper cover 5 into one piece. The slider crank mechanism including the crankshaft 2, the slide block 1 and the plunger seat 6 are assembled into one piece by the above-mentioned matching way and provided in the crankcase, the outer end of the crankshaft is provided with the connecting structure which connects with the power. The outer end of the plunger seat is provided with the plunger 11. Out of the inclined sidewall of the crankcase is provided with the pump head assembly 8 which is connected with the water inlet pipe assembly 9.

The present embodiment adopts the slider crank mechanism to replace the traditional crank connected rod mechanism as the core institution, which can reduce the volume and weight of the whole plunger pump and achieve the complete balance of the reciprocating motion inertia force, particularly, the plunger moves sinusoidally which can achieve the nearest cooperation between the plunger and the compressed liquid, it makes a further improvement of the pump's efficiency under the circumstance that the efficiency of the slider crank mechanism itself is higher than the crank connected rod mechanism.

The volume and weight of the plunger pump provided by the present embodiment is less than one third of the traditional plunger pump of the same displacement, and it is easy manufacturing and has the more extensive usable range. In addition, the plunger pump mechanism provided by the present embodiment can realize the series of products in the same platform with different flow and from the medium pressure to high pressure by adjusting the plungers in one platform.

In the above-mentioned embodiment, the crankshaft adopts the integrative crankshaft and the three-throw four-supported structure to achieve the high pressure and the ultrahigh pressure, which can improve the stiffness of the shafting significantly to make sure that the machine can work regularly and reliably and process a longer service life.

In the above-mentioned embodiment, it adopts the method by connecting the rolling bearing with the sliding bearing to improve the bearing support, particularly, the main bearing of the main journal and the bearing of the peripheral region of the slide block adopt the rolling bearing while the bearing of the peripheral region of the crank adopts the rolling bearing sliding.

In the above-mentioned embodiment, the slide block and the plunger seat adopt the separated structure, and there is the special annular outer ring after the slide blocks finish combination so that it could be used as the inner ring of the bearing, furthermore, the separated structure of slide block can also solve the assemble problem of the integrative crankshaft.

In the above-mentioned embodiment, the engine body also adopts the three separated structure, which are the crankcase upper cover, the bearing seat of the crankshaft provided with a slip way for guiding the upper section of the plunger (also known as the oriented track) and the engine seat.

In the above-mentioned embodiment, the lubrication between the plunger and the track adopts the method of the oil injection, the crankcase upper cover is provided with special apparatus to spray the lubricating oil on the six working cylinders and the tracks respectively.

What is mentioned above is only the preferred embodiments of the present invention, it should be noted that for those skilled in the art, they may take several improvements and alterations without departing from the principles of the present application which should be also taken within the protect scope of the present application.

The invention claimed is:

1. A reciprocating plunger pump, comprising a plunger pump body, a plunger pump head, and a slider crank mechanism which is located inside of the plunger pump body;

wherein the plunger pump body comprises an engine seat, a crankcase upper cover provided on the engine seat, and a bearing seat provided within the internal space formed within the engine seat of the plunger pump body and the crankcase upper cover;

wherein the engine seat of the plunger pump comprises a bottom wall and a bottom sidewall which is integrally formed with the bottom wall and extends away from an edge of the bottom wall and away from a surface of the bottom wall;

wherein the crankcase upper cover comprises an upper wall and an upper sidewall which extends from the upper wall and away from a surface of the upper wall;

wherein the engine seat of the plunger pump and the crankcase upper cover are connected such that the upper sidewall and bottom sidewall are connected by a connector;

wherein two crankshaft penetrating bores are formed through the sidewalls of the connected engine seat and crankcase upper cover;

wherein each crankshaft penetrating bore is formed by half bores located respectively on the upper sidewall and the bottom sidewall;

wherein the internal space formed between the engine seat of the plunger pump and the crankcase upper cover is a crankcase space which is provided with the bearing seat, the bearing seat is provided with at least one lower half bearing bore; the bearing seat and the crankcase upper cover are connected, and the lower half bearing bore and an upper half bearing bore which is located on the crankcase upper cover form a complete bearing bore which is a middle bearing bore;

wherein the middle bearing bore is located in the middle of the two crankshaft penetrating bores;

wherein the crankcase upper cover is penetrated by a plunger bore;

wherein the slider crank mechanism includes reciprocating parts, an unsplit crankshaft, and a slide block;

wherein the reciprocating parts contain a reciprocating parts body which is provided with a circular through bore which is an accommodation bore of the slide block;

wherein the reciprocating parts body is provided with a guide section which is along a reciprocating motion direction with an oriented surface;

wherein the slide block comprises a slide block body and an annular outer ring which is fitted over a peripheral region of the slide block body;

wherein the slide block body is a split structure comprising a first section and a second section and provided with an eccentric circular bore, which bore comprises two identical half bores, which are respectively arranged on the first section and the second section, which first section and second section each have a subdivision surface;

wherein the first section of the slide block body is provided with a first section assembly bore which is located on the subdivision surface of the first section;

wherein the second section is provided with a through bore penetrating from the subdivision surface to a peripheral surface of the second section;

wherein the unsplit crankshaft contains at least one crankpin;

wherein the crankpin of the unsplit crankshaft is at least fitted over by the slide block by penetrating the eccentric circular bore, wherein the slide block is fitted into the accommodation bore of the reciprocating parts;

wherein the unsplit crankshaft is located in a crankshaft space, wherein a corresponding crankshaft main journal and a crank arm are supported in the middle bearing bore of the bearing seat or in one of the two crankshaft penetrating bores; and wherein one end of a part of the reciprocating parts, which cooperates with the plunger pump head provided on an outer side of the plunger bore, penetrates into the plunger bore.

2. The reciprocating plunger pump of claim 1, wherein one of two opposite upper sidewalls of the crankcase upper cover is respectively provided with at least one of the half bores of the crankshaft penetrating bores, the other of the two opposite upper sidewalls is an inclined sidewall, a distance between the two opposite upper sidewalls is increased as they move away from the upper wall, the two opposite upper sidewalls are provided with the plunger bore, and a lower section of the crankcase upper sidewall forms an assembly surface for assembling with the engine seat;

wherein an axis of the upper half bearing bore is overlapped with an axis of each half bore of the crankshaft penetrating bore;

wherein the plunger bores on the two opposite upper sidewalls which are between any of two adjacent half bearing bores or between the half bearing bores and the half bores of adjacent crankshaft penetrating bores constitute a group of plunger bores;

wherein the bearing seat comprises a bearing seat body that comprises two or more half bearing bores coaxially arranged as lower half bearing bores;

wherein a group of oriented tracks with two orthogonal axes are respectively arranged on the bearing seat body between two adjacent lower half bearing bores and the bearing seat body on an edge outside of any half bearing bores;

wherein two oriented tracks of each group of the oriented tracks are respectively located on both sides of an axis of the lower half bearing bore which is perpendicular to an axis of the two oriented tracks; and wherein the plunger bore is arranged relative to each of the oriented tracks.

3. The reciprocating plunger pump of claim 1, wherein the crankshaft is a three-throw four-supported crankshaft, the reciprocating parts are six plungers each containing a respective plunger seat and plunger pump head, there are six slide blocks which are made into a double slide blocks group with a phase difference of 180 degrees in pairs, a reciprocating motion direction of two plungers fitted over by the double slide block groups forms an angle of 90 degrees, and correspondingly, there are three plunger bores which are located on two opposite upper sidewalls on the crankcase upper cover respectively.

4. The reciprocating plunger pump of claim 3, wherein in the double slide blocks groups, two slide blocks of the slide block groups are alternatively named a first slide block and a second slide block; and wherein a first section of the first slide block and a second section of the second slide block are fitted into one piece, which peripheral regions of the two slide blocks are provided with an annular outer ring.

5. The reciprocating plunger pump of claim 3, wherein the plunger seat body is divided along a center plane of the accommodation bore of the slide block into two parts, which are an upper half part and a lower half part;

wherein the accommodation bore of the slide block is divided into two half accommodation bores of the slide block; and wherein the two oriented tracks are located on the upper part and the lower part, respectively, the upper part and the lower part are fitted into one piece by a connector.

6. The reciprocating plunger pump of claim 5, wherein the subdivision surface is perpendicular to the reciprocating motion direction of the plunger seat;

wherein a through bore which is penetrating through the upper part and the lower part is respectively located in the plunger seat body and on two opposite sidewalls of the accommodation bore of the slide block;

wherein orientation of the through bore is in accordance with a direction of reciprocating motion of the plunger seat; and wherein after the upper part and the lower part are fitted into a complete plunger seat body, relevant through bores of the upper part and the lower part are in alignment, and the two half accommodation bores of the slide block is in alignment, which forms complete accommodation bores of the slide block, the upper part and the lower part are fitted into one piece with a connector penetrating through the through bore.

7. The reciprocating plunger pump of claim 1, wherein a texture of the annular outer ring is different from a texture of the slide block body, wherein abrasion resistance of the outer ring is better than the slide block body's abrasion resistance.

8. The reciprocating plunger pump of claim 1, wherein the plunger pump is a plunger water pump.

9. A slider crank mechanism comprising reciprocating parts, an unsplit crankshaft, and a slide block;

wherein the reciprocating parts contain a reciprocating parts body;

wherein the reciprocating parts body is provided with a circular through bore which is an accommodation bore of the slide block;

wherein the reciprocating parts body is provided with a guide section which is along a reciprocating motion direction with an oriented surface;

wherein the slide block comprises a slide block body and an annular outer ring which is fitted over a peripheral region of the slide block body;

wherein the slide block body is a split structure comprising a first section and a second section and provided with an eccentric circular bore comprising two identical half bores, which are respectively arranged on the first section and the second section, which first section and second section each have a subdivision surface;

wherein the first section of the slide block body is provided with an assembly bore which is open on the subdivision surface and is a first section assembly bore;

wherein a relevant position between the second section and the first section of the assembly bore is provided with a through bore which is penetrating from the subdivision surface of the second section to a peripheral surface thereof;

wherein the unsplit crankshaft contains at least one crankpin; and wherein the crankpin of the unsplit crankshaft is fitted over by at least one slide block by penetrating the eccentric circular bore, each of the slide blocks is fitted into the accommodation bore of the reciprocating parts.

10. The slider crank mechanism of claim 9, wherein the reciprocating part is a piston or a dynamic balance slide block or a plunger seat.

11. The slider crank mechanism of claim 9, wherein two or more slide blocks form a slide block group, adjacent slide blocks are arranged at an angle of 180 degrees, and in adjacent slide blocks, the first section of one slide block and the second section of another slide block are formed into one piece.

12. The slider crank mechanism of claim 9, wherein the slide block group consists of two slide blocks, and wherein the axial direction of the two reciprocating parts fitted over by two slide blocks is at the angle of 90 degrees.

13. A slide block for a slider crank mechanism, comprising a slide block body and an annular outer ring which is fitted over on a peripheral region of the slide block body;

wherein the slide block body is a cylinder with two opposite end surfaces and peripheral surfaces, the slide block body is provided with a circular through bore penetrating through the two end surfaces, and a central axis of which is parallel to a central axis of the slide block body, which is an eccentric circular bore;

wherein the slide block body is a split structure;

wherein a subdivision surface passes through a center of the eccentric circular bore which divides it into two identical half bores;

wherein two parts which are divided from the slide block body are a first section and a second section respectively;

wherein the first section is provided with an assembly bore which is open on the subdivision surface and which is a first section assembly bore;

wherein a relevant position between the second section and the first section of the assembly bore is provided with a through bore which is penetrating the subdivision surface of the second section to peripheral surface thereof;

wherein when being assembled, the assembly bore of the first section aligns with the through bore of the second section, and a connector penetrates the through bore and screws into relevant assembly bore of the first section, which assembles the two parts divided from the slide block body into one piece.

14. A slide block group comprising at least two slide blocks, each of the slide blocks including a slide block as claimed in claim 13;

wherein adjacent slide blocks are arranged at an angle of 180 degrees, and in adjacent slide blocks, the first section of one slide block and the second section of another slide block are formed into one piece.

15. A slide block group of claim 14, wherein it is made of two slide blocks, which are a first slide block and a second slide block respectively;

wherein the first section of the first slide block and the second section of the second slide block are formed into one piece, and peripheral regions of the two slide blocks are provided with annular outer rings;

wherein the second section of the first slide block and the first section of the second slide block are separated structures, or both of them are integrative structures.

\* \* \* \* \*